Figure 1:
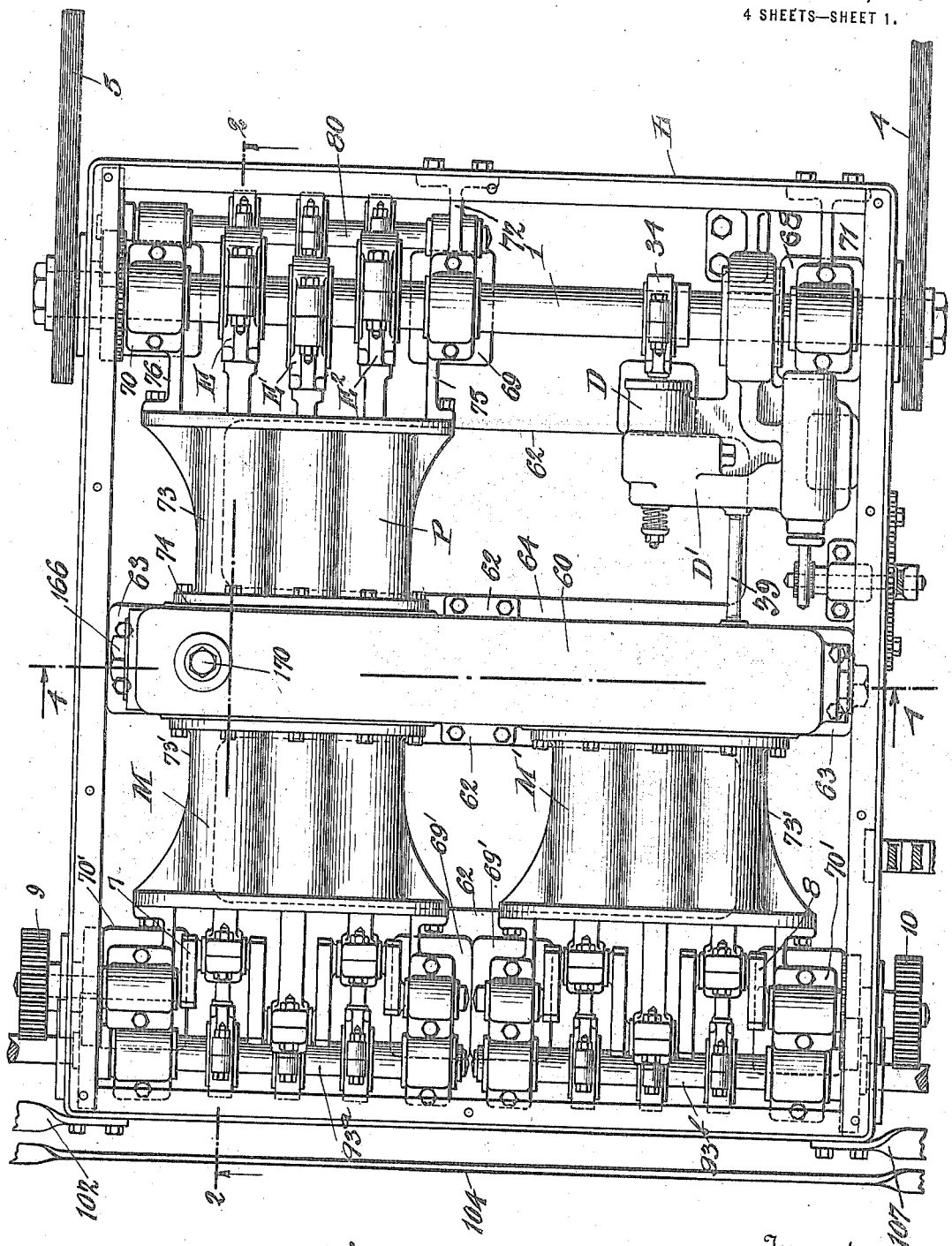

A. SUNDAH.
HYDRAULIC VARIABLE AND DIFFERENTIAL SPEED GEAR.
APPLICATION FILED MAY 17, 1909.

1,206,387.

Patented Nov. 28, 1916.
4 SHEETS—SHEET 1.

Witnesses:
J. G. Bethell
J. F. Rule

Inventor:
August Sundh
By L. K. Campbell
Attorney

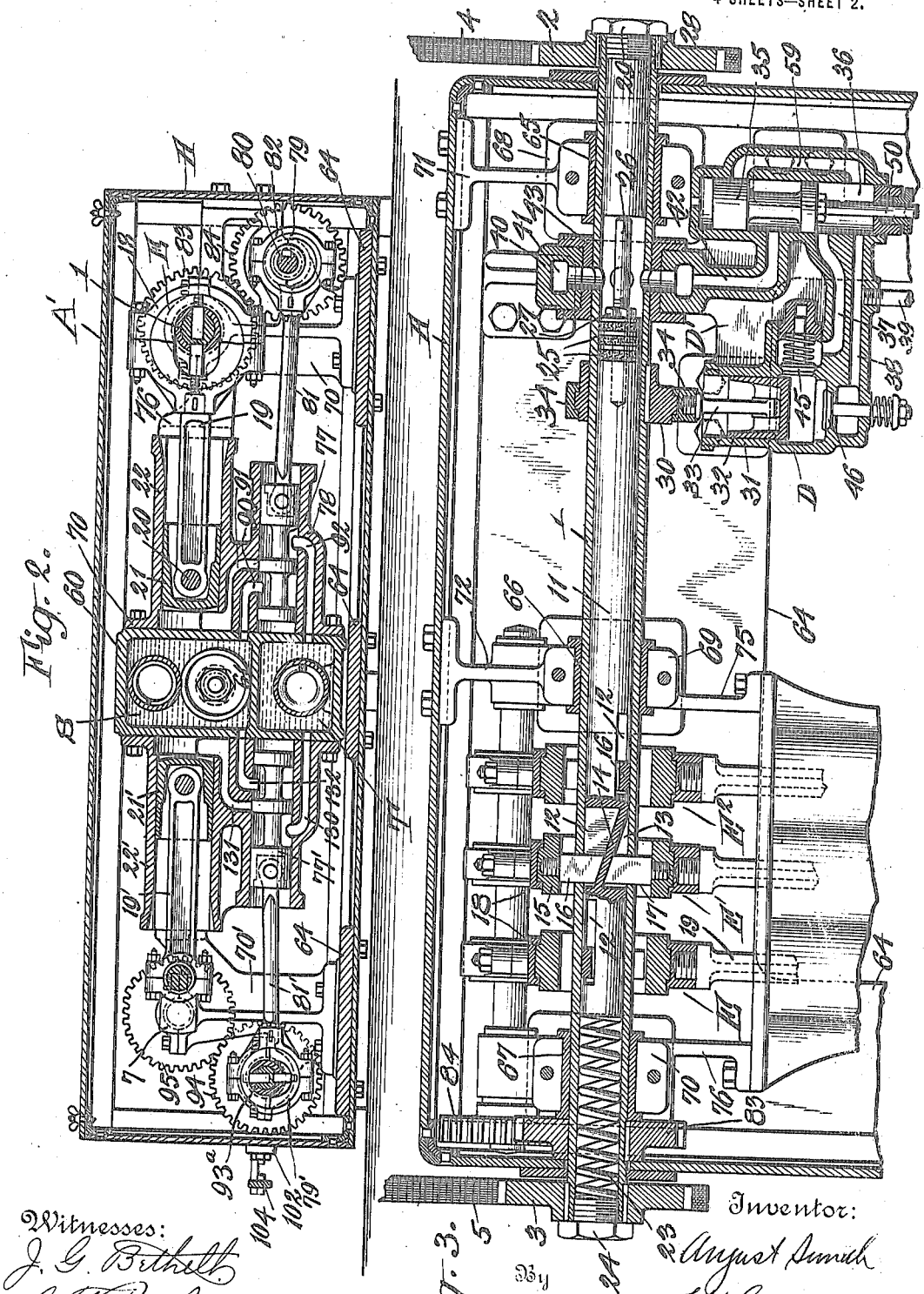

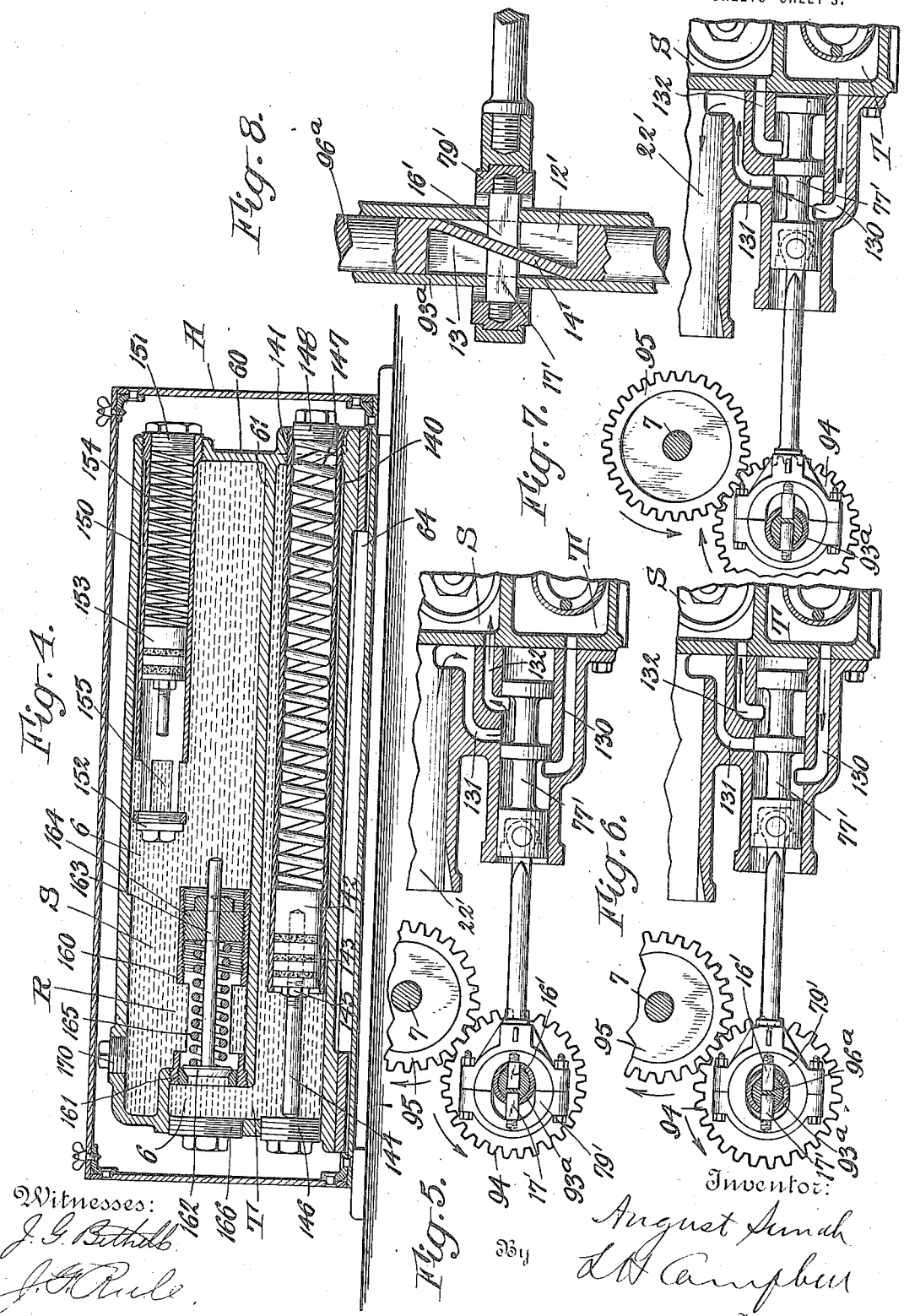

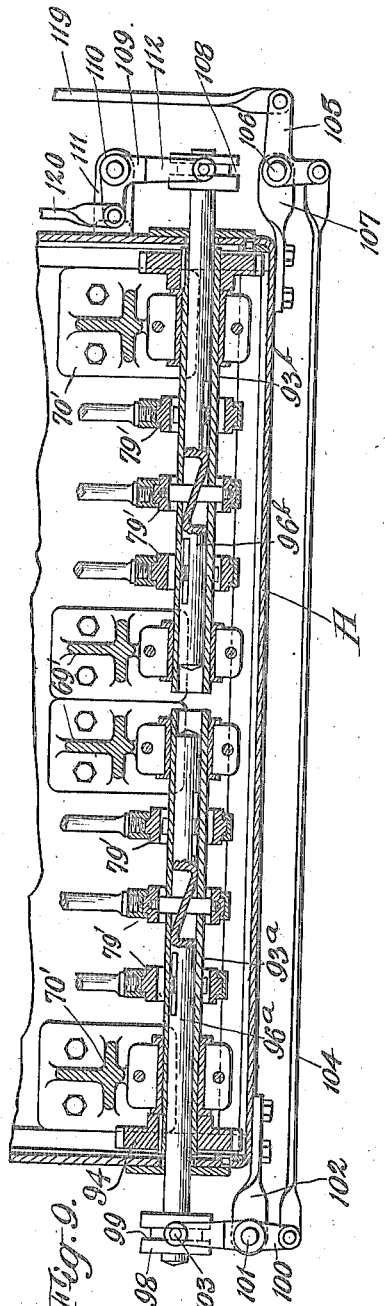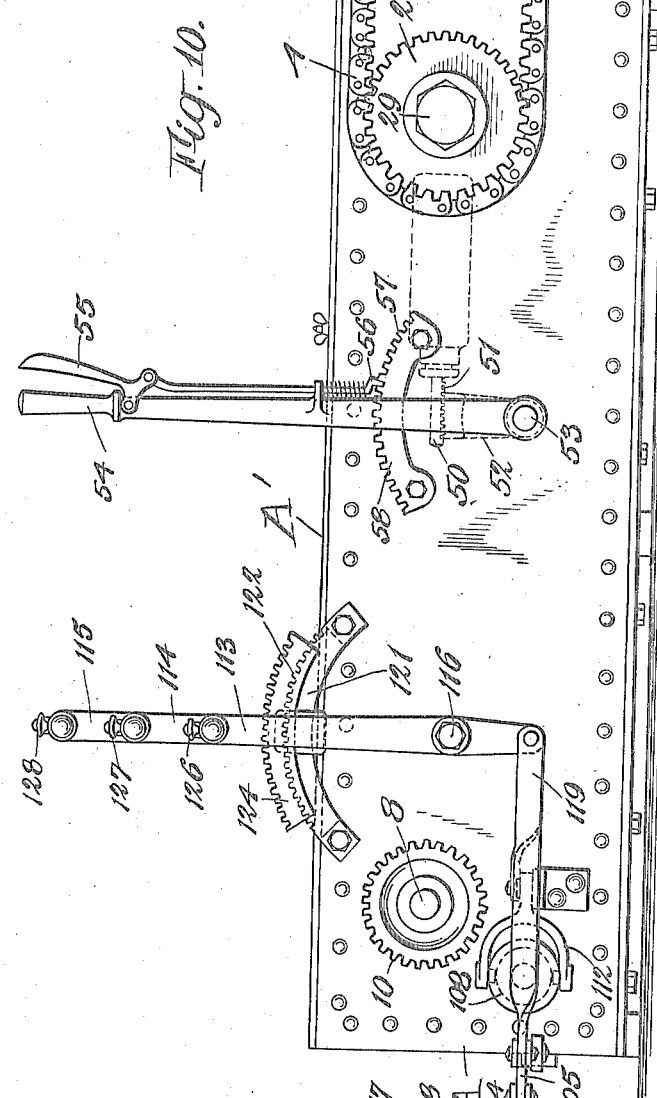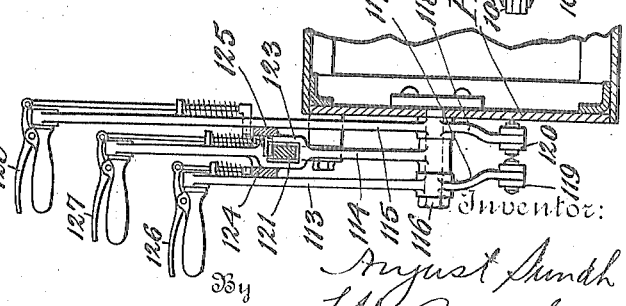

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

HYDRAULIC VARIABLE AND DIFFERENTIAL SPEED GEAR.

1,206,387.

Specification of Letters Patent.  Patented Nov. 28, 1916.

Application filed May 17, 1909.  Serial No. 496,357.

*To all whom it may concern:*

Be it known that I, AUGUST SUNDH, a citizen of the United States, residing in Yonkers, in the county of Westchester and State of New York, have invented a new and useful Improvement in Hydraulic Variable and Differential Speed Gears, of which the following is a specification.

My invention relates to mechanisms for transmitting power by fluid pressure, and comprises means for varying the amount of power transmitted, and also comprises means for differentially varying the speed of the driven mechanism.

One of the objects of the invention is to obtain power transmission mechanism of this character, which is simple in construction, efficient in operation and in which a gradual variation in the power may be obtained throughout a wide range.

A further object of the invention is to reduce the size of the mechanism to a minimum, and make the same self-contained, so that the same may readily be connected between a prime mover or source of power and the machinery to be driven.

A still further object of the invention is to obtain fluid power transmission mechanism which may be used not only as a variable speed gear, but also as a brake, and which may further be used as a steering apparatus.

The invention is adapted for use on automobiles, motor boats, differentially driven elevators, and various other devices.

Referring to the accompanying drawings in which is illustrated a construction embodying my invention, Figure 1 is a plan view of the power transmission mechanism with the top cover of the inclosing casing removed; Fig. 2 is a sectional elevation taken substantially on the line 2—2 of Fig. 1; Fig. 3 is a sectional plan view of the driving shaft and parts associated therewith; Fig. 4 is a sectional elevation through the pressure and supply tanks and taken on the line 4—4 of Fig. 1; Fig. 5 is a fragmentary view showing a motor valve and the eccentric for operating the same; Figs. 6 and 7 are similar views showing the eccentric adjusted to different positions; Fig. 8 is a detail view of means for adjusting the eccentric; Fig. 9 is a sectional plan view of the eccentrics for operating the motor valves and means for adjusting said eccentrics; Fig. 10 is a side elevational view of the invention; Fig. 11 is a fragmentary view showing the adjusting levers for adjusting the eccentrics for the motor valves.

The power transmitting mechanism is inclosed in a rectangular casing A, provided with a removable cover A'. A hollow driving shaft 1 extends through the front portion of the casing, and has keyed thereto at its opposite ends sprocket wheels 2 and 3, which may be connected by sprocket chains 4 and 5 respectively with a prime mover such as an electric motor, an internal combustion engine or any other suitable source of power, the exact nature of which will of course depend upon the particular use to which the invention is applied. The means for gearing the shaft 1 to a source of power may be varied as desired. The shaft 1 operates the eccentrics E, E' and $E^2$ which drive the pumping mechanism P. The latter draws liquid from the supply chamber S and forces it under pressure into the pressure chamber T. The liquid 6 from the pressure chamber is circulated through motors M and M' and from thence back into the supply chamber S. The motors M and M' dive the crank shafts 7 and 8 respectively to which are keyed the gear wheels 9 and 10, adapted to be geared to the driven mechanism.

Within the driving shaft 1, which is hollow as shown in Fig. 3, is a rod 11 adjustable longitudinally within the shaft. Opposite each of the eccentrics E, E' and $E^2$ the rod 11 is formed with oppositely disposed slots or recesses 12 and 13. The base of each slot is inclined in the same direction so that a web 14 is formed between each pair of slots.

The eccentrics E, E' and $E^2$ are substantially alike in construction, and each comprises a ring or sleeve 15. Within the sleeve 15 are studs or cams 16 and 17, the outer ends of which are threaded into the ring 15. These studs extend into the recesses 12 and 13, and their inner ends are inclined to correspond to the web 14. Surrounding each eccentric ring 15 is an eccentric strap 18 secured to the outer end of a piston rod 19, the inner end of which is pivoted at 20 to a piston 21 adapted to reciprocate in a pump cylinder 22.

The rod 11 is normally held in the position shown in Fig. 3 by means of a coil spring 23, the inner end of which bears against the rod 11. The outer end of the spring 23 bears against a stud bolt 24 threaded into the end of the driving shaft 1, and which also serves to hold the gear wheel 3 in position. The opposite end of the rod 11 is preferably provided with packings 25 so as to prevent leakage when the rod 11 is operated by liquid pressure as a piston within the hollow shaft or cylinder 1, as will presently be described. Extending from the right hand end of the rod or piston 11 is a rod 26 of reduced diameter, adjustable within the piston 11, and held in adjusted position by a set nut 27. The outer end of the rod 26 bears against the plug 28 which is preferably a tight fit within the hollow shaft 1. A stud bolt 29 threaded into the shaft 1 bears against the plug 28 and also serves to hold the gear wheel 2 on the shaft.

Keyed to the drive shaft 1 is an eccentric 30 adapted to drive a small pump D. The latter comprises a cylinder 31 in which is adapted to reciprocate a piston 32 connected by a link 33 to the eccentric strap 34 surrounding the eccentric 30. The operation of the pump D is controlled by a valve 35 slidable within the valve chamber 36. Passages 37 and 38 lead from the pump cylinder to the valve chamber 36. A pipe 39 leads from the passage 38 to the supply chamber S. The pump cylinder 31, the passages 37 and 38 and the case for the valve 35 are preferably formed in a single casting D'. This casting has a portion 40 surrounding the shaft 1, and provided with an annular passage 41 connected by a passage 42 with the valve chamber 36. A sleeve or bushing 43 is secured to the driving shaft 1, and rotates therewith. This sleeve and shaft 1 are provided with ports establishing communication between the interior of the shaft 1, and the annular passage 41. The pump D is operated continuously while the shaft 1 is rotating. When the valve 35 is in the position shown, the pump piston 32 during its inward movement forces the liquid past the check valve 45 through the passage 37 into the valve chamber 36, and from thence through the passage 38 and pipe 39 to the supply chamber S. During the outward movement of the piston 32, the liquid is drawn from the supply chamber S through the pipe 39, passage 38 and past the check valve 46 into the pump cylinder. In order to effect an adjustment of the eccentrics E, E' and E² the valve 35 is moved outward, so as to establish communication between the passages 37 and 42. The inward movement of the pump piston 32 will then force the liquid through the passages 37, 42 and 41 into the hollow shaft 1. As the pump piston moves outward the check valve 45 prevents a return flow of the liquid from the shaft 1, and liquid is drawn from the supply chamber through the pipe 39, passage 38 and past the check valve 46 into the cylinder 31 to be forced into the hollow shaft 1 on the next inward stroke of the piston. The liquid as it is thus pumped into the shaft 1 forces the piston rod 11 to the left, and the cam studs 17 are forced outward by the inclined webs 14, thereby moving the eccentrics from a position concentric with the driving shaft as shown to an eccentric position. During this adjustment of the eccentrics, the cam studs 16 of course maintain the same relative position with respect to the cams 17, or in other words remain in contact with or in close proximity to the webs 14, so that when the rod 11 is moved to the right, the webs 14 force the cams back toward a concentric position. The piston valve 35 controlling the pump D is provided with a valve stem 50 provided at its outer end with rack teeth 51, Fig. 10. An arm 52 secured to a pivot stud 53 journaled in the side of the casing A is provided with rack teeth meshing with the rack teeth 51 on the valve stem. The arm 52 is rocked to adjust the position of the valve by means of a hand lever 54 secured to the pivot stud 53. The lever 54 is held in any desired position by means of a latch or pawl 56 engaging with rack teeth 57 formed on a segmental rack bar 58 bolted to the casing A concentric with the pivot 53. The latch 56 is operated by an ordinary latch lever 55. In order to adjust the eccentrics E, E' and E² toward a central position, the hand lever 54 is moved forward from the central position shown in Fig. 10, thereby moving the valve 35 farther inward. This brings the passage 42 into communication with a by-pass 59 extending around the outer end of the valve. The spring 23, which is under compression, now forces the rod 11 to the right, forcing the liquid in front of said rod out through the passages 42, 59, 38 and through the pipe 39 to the supply chamber. It will be seen that the eccentrics may be adjusted to any desired intermediate position, and when in such position are prevented from further movement in either direction by locking the hand lever 54 in its central position as shown. In this position the valve 35 prevents a further escape of the liquid from the hollow shaft 1, and the spring 23 holds the rod 11 as far to the right as the remaining liquid in the shaft will permit.

The pressure and supply chambers T and S are comprised in a casing 60 separated into two compartments by the partition 61 extending longitudinally through the casing 60. The latter is provided with side flanges 62, and end flanges 63 bolted to a base or frame 64. It will be observed that this frame 64 which is bolted or otherwise secured to the bottom of the outer casing A is in the form of a rectangular plate covering substantially the entire bottom surface of the casing A with the exception of cut-away portions located beneath the pumping mechanism and the motors M and M'. The plate 64 forms a support for substantially all of the mechanism located within the casing A. The driving shaft 1 is journaled in bushings 65, 66 and 67 in the standards or brackets 68, 69 and 70, respectively, which are bolted to the base-plate 64. The standards 68 and 69 are provided with lateral flanges or brackets 71 and 72 bolted to the front wall of the casing A. This construction forms a firm and rigid support for the journal bearings for the driving shaft 1. The pumping mechanism comprises a pump casing 73 provided with pump cylinders 22. The casing 73 is preferably made of a single casting and provided with flanges 74, by means of which it is bolted or otherwise rigidly secured to the casing 60. The front end of the pump casing is bolted to brackets 75, 76, formed on the standards 69 and 70, respectively. The circulation of liquid in the pumps is controlled by valves 77 adapted to reciprocate in the valve casings 78, which latter are preferably cast integral with the pump casing 73. The pump valves 77 are operated by means of eccentric 79 keyed to a shaft 80. Piston rods 81 are pivoted at their inner ends to the valves 77 and at their outer ends are connected to the eccentric straps 82 surrounding the eccentrics 79. The eccentric shaft 80 is driven from the shaft 1 by means of spur gears 83 and 84 keyed to the shafts 1 and 80, respectively. These spur gears are the same size so that the shafts will rotate together at the same angular speed. The arrangement of the eccentrics for operating the pump valves on a separate shaft from the main or driving shaft 1 is of importance in economizing space, as it permits of a much more compact arrangement, and requires much less room than when the valve eccentrics are mounted on the main driving shaft.

In Fig. 2 a pump piston 21 is shown at the inner end of its stroke, the valve 77 being in an intermediate position. The shaft 1 rotates in a clockwise direction, and therefore as the pump piston 21 moves outward, the valve 77 is also moved outward from the position shown. Communication is therefore established between the supply chamber S and the pump cylinder, through the passages 90 and 91, so that the liquid is drawn from the supply chamber into the pump cylinder. By the time the pump piston has reached the end of its outward stroke the valve 77 has been moved to its outermost position and again returned to the position shown. The continued rotation of the shaft 1 moves the valve 77 further inward and opens communication between the passage 91 and a passage 92, leading from the valve chamber into the pressure chamber T. The inward stroke of the piston 21 will therefore force the liquid from the cylinder 22, through the passage 91, valve chamber and passage 92 into the pressure chamber and passage 92 into the pressure chamber T. The operation of the pumping chamber T. The operation of the pumping mechanism P therefore draws liquid from the supply chamber S and forces it into the pressure chamber T. The rate at which the liquid is pumped depends upon the adjustment of the eccentrics on the driving shaft, the length of the piston stroke being adjustable from zero to a maximum by means of the mechanism already described.

The construction of the motors M and M' is substantially the same in many respects as that of the pumping mechanism. Each of these motors comprises a casing 73' secured at its inner end to the casing 60 and at its outer end to standards 69' and 70' in which the crank shafts 7 and 8 are journaled. Each motor comprises cylinders 22', pistons 21' and piston rods 19' connecting the pistons to the crank shafts. The motor valves 77' are substantially like the pump valves 77, but the eccentrics for operating the motor valves are made adjustable by a construction somewhat similar to that associated with the driving shaft 1, for adjusting the eccentrics E, E' and E².

Referring particularly to Figs. 1, 8 and 9, it will be seen that the eccentrics 79' for operating the valves of the motor M are mounted on a hollow shaft 93ª, and that the eccentrics 79' for the valves of the motor M' are likewise mounted on a hollow shaft 93ᵇ. The shaft 93ª is connected to be driven from the crank shaft 7 by means of intermeshing spur gears 94 and 95 keyed to the shafts 93ª and 7, respectively. The shaft 93ᵇ is driven in like manner by the crank shaft 8. Within the hollow shafts 93ª and 93ᵇ are longitudinally adjustable rods 96ª and 96ᵇ. These rods are each formed with cam slots or recesses 12' and 13' separated by webs 14' coöperating with the cam studs 16' and 17' secured in the eccentrics 79'. This construction is substantially like the corresponding construction in Fig. 3, except that the parts are so disposed that the cams 16' and 17' engage an intermediate portion of the web 14' when the eccentric 79' is in a central position, so that the eccentric may be adjusted in either direction from a central position. As shown in Fig. 9, the rod 96ª has secured to its outer end a sleeve 98 provided with an annular recess 99. A lever 100 pivoted at 101 to a bracket 102 secured to the casing A has one end bifurcated and provided with studs 103 engaging the slot 99. The opposite end of the lever 100 is connected by a link or rod 104 to one end of a bell-crank lever 105 pivoted at 106 to bracket 107 secured to the casing A. Secured to the outer end of the rod 96ᵇ is a sleeve formed with a recess 108, A bell crank lever 109 pivoted at 110 to a bracket 111 has a bifurcated end 112 provided with studs engaging the recess 108. As shown in Figs. 10 and 11, a series of hand-levers 113, 114 and 115 are mounted on a pivot bolt 116 secured to the casing A. The hand levers 113 and 115 are provided with arms 117 and 118 extending below the pivot and connected respectively to links 119 and 120, the opposite ends of which are connected to the bell crank levers 105 and 109, respectively. A segmental rack 121 is secured to the casing A, and formed with rack teeth 122, arranged concentric with the pivot 116. The rack 121 extends through an opening formed in an enlargement 123 of the lever 114. The lever 114 has formed integral therewith or secured thereto, segmental racks 124 and 125, also arranged concentric with the pivot 116, and each provided with rack teeth. The levers 113, 114 and 115 are each provided with a locking pawl or latch. These latches are operated by the latch levers 126, 127 and 128, and coöperate with the rack teeth in the segmental racks 124, 121 and 125, respectively. It will be seen that with this construction, when the middle lever 114 is moved in either direction the levers 113 and 115 are carried with it, and either the lever 113 or 115 may be operated independently of the other levers. In Figs. 9 and 10 the parts are shown in an intermediate or neutral position; that is said levers are in a central position and hold the rods 96ᵃ and 96ᵇ in an intermediate position, so that the eccentrics 79' are all concentric with their driving shafts. If the lever 113 for example is moved rearwardly, motion will be transmitted through the link 119, bell crank 105, rod 104 and lever 100, and move the rod 96ᵃ longitudinally outward, thereby moving the eccentrics 79' for the valves of the motor M rearwardly or toward the adjacent side of the casing A as viewed in Fig. 9. If the lever 113 is moved in a forward direction these eccentrics will be adjusted inward toward the motor. A rearward movement of the lever 115 will in like manner move the rod 96ᵇ longitudinally inward or to the left, and effect an outward adjustment of the eccentrics for the valves of the motor M', and a forward movement of the lever 115 would adjust said eccentrics inwardly or toward the motor. If the middle lever 114 is adjusted in either direction, the levers 113 and 115 which are locked thereto would be carried with it and effect a simultaneous adjustment of all of the eccentrics 79'.

The operation of the motors will be understood from the following description: When the parts are in the position shown in Fig. 2, the crank shaft 7 will be rotated in a clockwise direction. The valve 77' is in its central position, and the eccentric 79' is adjusted on the shaft 93ᵃ to give a full throw of the valve 77'. The shaft 93ᵃ rotates in a counter-clockwise direction, and as it carries the valve to the right from the position shown, communication is established between the pressure chamber T and the motor cylinder 22', by way of the passages 130 and 131. This position of the valve is shown in Fig. 7. The liquid from the pressure chamber will therefore enter behind the piston 21, and exert a pressure thereon to drive the same forward. The throw of the valve is sufficient to fully open the port 131 so that the full pressure of the liquid from the pressure chamber may be exerted on the pump piston. By the time the piston has reached the outer end of its stroke, the valve 77' has been moved inward and again returned to the central position. The continued movement of this valve to the left puts the passage 131 into communication with the passage 132, extending to the supply chamber S. The liquid in the motor cylinder may therefore flow back to the supply chamber through the passages 131 and 132 during the return stroke of the piston. If the eccentrics 79' are adjusted toward a central position in the manner already described, the length of stroke of the valves 77' will be reduced. Each valve therefore as it is reciprocated will only partially open the port 131, so that the flow of liquid from the pressure chamber to the motor cylinder, and also the return flow from the motor cylinder to the supply chamber will be restricted or throttled. This throttling of the liquid prevents the full pressure being exerted on the piston during its outward stroke. If the motor is operating at a comparatively high speed, this decrease in pressure or throttling effect will of course be much greater than at a slower speed. The throttling of the liquid during the return stroke acts as a brake to retard the inward movement of the piston. When the eccentrics are adjusted to a position concentric with their driving shafts, as indicated in Fig. 6, the valves 77' will be held stationary with the passage 131 closed, so that there will be no flow of liquid either to or from the motor cylinders. This position therefore of the valve mechanism prevents any movement of the motors, the valves acting as locking devices to hold the motors stationary.

The direction of either or both of the motors M and M' may be reversed by adjusting the eccentrics 79'. This will readily be understood from a comparison of Figs. 5, 6 and 7. In Fig. 6, the eccentric is adjusted to a central position, the shaft 93ᵃ being in such position that the cam studs 16' and 17' extend in a horizontal direction. In this position the motor piston 21' will be at the middle of its stroke, the shaft 7 being rotated 90° from the position shown in Fig. 2. Assuming the motor to be at rest with the piston in such position it will be apparent that if the eccentric is moved to the position shown in Fig. 5, the valve 77' will be moved outward and the flow of liquid when the motor is started will be toward the supply chamber. Or in other words, the piston will be moved inwardly. If, however, the eccentric is adjusted to the position shown in Fig. 7, the valve 77' will be moved inwardly so as to place the motor cylinder in communication with the pressure chamber, and the piston will therefore move outwardly.

It will now be apparent that by means of the hand levers shown in Fig. 11, the eccentrics controlling the motors may be adjusted to effect the operation of the two motors in unison in either direction, and at any desired speed. The direction and speed may also be varied as desired. By moving either the lever 113 or lever 115 alone, a differential operation of the motors will be effected. The relative speeds of the motors may in this way be varied to any desired extent, or one motor may be stopped or started in the reverse direction, without stopping other motor, and without altering the speed of the pumping mechanism. This arrangement whereby a differential action of the motors may be secured is of value for many purposes where it is desired to secure a differential operation of the mechanism to be driven, especially where means for readily controlling this differential action is required. For example, if this power transmission mechanism were employed in propelling a boat provided with twin screw propellers, the latter could be geared to the motors M and M' respectively, and the boat steered by varying the speed of the motors. In a similar manner the mechanism could be employed in driving and to assist in steering automobiles, the motors M and M' being geared to the drive wheels.

Referring to Fig. 4, it will be seen that the pressure chamber T is provided with an accumulator, comprising a long tubular chamber or cylinder 140, the outer end of which is preferably formed with screw threads so that it may be screwed in a correspondingly threaded portion 141 of the casing 60. A piston 142 provided with packings 143 to make the same liquid-tight is movable longitudinally in the cylinder 140. A piston rod 144 threaded into the piston and held in adjusted position by a locknut 145 limits the outward movement of the piston by engaging a screw threaded plug 146 in the end of the pressure chamber. A heavy coil spring 147 is located within the cylinder 140, and bears at its opposite ends against the piston 142 and a screw threaded plug 148 in the end of the cylinder. When the pumping mechanism is in operation, the pressure in the chamber T is sufficient to move the piston 142 inward, and compress the spring 147 to a greater or less extent. The pressure in the chamber T depends upon the rate at which the pump is forcing liquid into said chamber, upon the load on the motors, the adjustment of the eccentrics controlling the motor valves, and other conditions of operation. Within the supply chamber S is an accumulator comprising a cylinder or tube 150 which is secured within the casing 60 in substantially the same way as the cylinder 140 is secured. The outer end of the tube 150 is closed by a plug 151, and the inner end is also provided with a plug 152. A piston 153 is limited in its movement to the left by the plug 152. A comparatively light coil spring 154 is located in the tube 150. Ports 155 formed in the tube permit the flow of liquid into and out of the tube in front of the piston. The accumulator in the pressure chamber maintains an elastic pressure on the liquid, and prevents any sudden changes in pressure, thereby securing a smooth operation of the mechanism, preventing any sudden rise in pressure and consequent strain on the mechanism. It also permits temporary variation in the relative speed of the pumping mechanism and motors, without unduly increasing or decreasing the pressure in the chamber T. For example, in stopping or reversing one of the motors, the rate at which the liquid is circulated therethrough will be decreased, causing a consequent temporary increase in the amount of liquid stored in the pressure chamber, which is provided for by the accumulator, the piston 143 being moved farther inward as the pressure increases. The accumulator in the supply chamber S maintains only a slight pressure as the spring 154 is comparatively weak. It has been found by experience that it is important to maintain a slight pressure on the liquid in the supply chamber. The accumulator in this chamber also serves to prevent sudden variations in the pressure and prevents a vacuum or partial vacuum being formed in the supply chamber, when the pressure in the chamber T rises.

In order to prevent the pressure in the pressure chamber T from rising above a safe limit, a relief valve R is provided which comprises a sleeve or tube 160 one end of which has screw threaded connection 161 in a vertical portion of the partition 61 which separates the pressure and supply chambers. The movable valve member 162 is provided with a valve stem 163 which extends rearwardly and is slidable freely through a threaded plug 164 which is adjustable in a threaded portion of the tube 160. A heavy coil spring 165 surrounds the stem 163 and bears at its opposite ends against the valve member 162, and the plug 164. The spring 165 normally holds the valve tight against the side, but is adjusted so that when the pressure in the chamber T rises above a predetermined safe limit, the valve is opened and allows liquid to go directly from the pressure to the supply chamber, thereby relieving the excessive pressure. The pressure at which the relief valve operates may be varied by adjusting the plug 164. A plug 166 in the end of the casing 60 permits the relief valve to be readily removed. The plug 146 likewise permits the removal of the accumulator in the pressure chamber. A removable plug 170 in the top of the supply chamber permits the operating liquid to be supplied or replenished. The liquid used is preferably a light oil, although water or other liquid may be used if desired.

The operation of the present invention may be briefly summarized as follows:—Assuming that the driving shaft 1 is being driven from any suitable source of power, and that the parts illustrated in Figs. 3 and 10 are in the position shown, the pumping mechanism and motors will be at rest, the eccentrics E, E' and E², being concentric with the driving shaft. To start the pumping mechanism, the operator moves the lever 54 (shown in Fig. 10) forward so that the valve 35 will be moved into position to permit the small pump D to force liquid into the hollow shaft 1, and thereby move the eccentrics off center, and start the pumping mechanism. The levers (Figs. 10 and 11) controlling the motors M and M' may now be adjusted to secure any desired operation of the motors M and M'. By moving the lever 114 forward, the motors will operate together at the same speed and in the same direction. By reversing the lever 114, the motors will be reversed, and by operating the levers 113 and 115 independently, the motors may be independently controlled to secure any desired differential action. By moving the levers toward a central position while the motors are running a powerful braking effect may be obtained. The extent of this braking action is under the complete control of the operator.

Various changes in the details of construction and arrangement of parts may obviously be made by those skilled in the art, without departing from the spirit and scope of the invention. I wish therefore not to be limited to the particular features of construction as herein disclosed.

What I claim as new and desire to secure by Letters Patent of the United States is:—

1. The combination with a pressure chamber and a supply chamber closed to atmospheric pressure, of means for circulating a liquid through said chambers, and devices within said chambers for independently maintaining a continuous elastic pressure on the liquid in both of said chambers during the normal operation of said circulating means.

2. The combination with a supply chamber, of a device within the chamber and operable constantly to maintain a light elastic pressure on liquid in said chamber, a pressure chamber, means therein operable continuously to maintain a heavy elastic pressure of liquid therein, and means for circulating liquid through said chambers.

3. The combination with a pressure chamber and a supply chamber, of cylinders therein, a piston in each cylinder, and springs within the cylinders behind the pistons.

4. The combination of a hollow shaft, an eccentric carried thereby, a cam device within the shaft for adjusting the eccentric, means to apply fluid pressure within the shaft to operate the cam device, and pumping mechanism operated by the eccentric and having an output regulated by the adjustment of said eccentric.

5. The combination with a hollow shaft, of an eccentric thereon, pumping mechanism operated thereby, a member movable longitudinally within the shaft and provided with a cam surface, a coöperating member carried by the eccentric and extending into position to engage said cam surface, and fluid pressure mechanism for operating said longitudinally movable member.

6. The combination with a hollow shaft, of an eccentric mounted thereon, pumping mechanism operated by the eccentric, a rod movable longitudinally within the shaft, and having oppositely disposed portions cut away to form parallel inclined surfaces, studs carried by the eccentric and extending into position to engage said surfaces, and fluid pressure mechanism for operating said rod.

7. The combination with a hollow shaft, of an eccentric mounted thereon, pumping mechanism operated by the eccentric, a piston within the shaft, mechanical connections between the piston and eccentric for adjusting the latter when the piston is moved, and means for supplying fluid pressure to the shaft to operate the piston.

8. The combination with a hollow driving shaft, of eccentrics mounted thereon, pumping mechanism operated by the eccentrics, a member movable longitudinally within the shaft and provided with cam surfaces, means carried by the eccentrics and coöperating with said cam surfaces for adjusting the eccentrics when said member is moving, and means for operating said member by fluid pressure.

9. The combination with a plurality of motors operable continuously by fluid pressure, of means for supplying fluid under pressure to operate the motors, valve mechanism associated with each motor for controlling the operation thereof, and means for operating said valve mechanisms to effect a variation in the speed of the motors either together or independently.

10. The combination with motors operable continuously by fluid pressure, valve mechanism associated with each motor and controlling the operation thereof, and means for operating the valve mechanisms for the motors either together or independently.

11. The combination with a plurality of motors operable continuously by fluid under pressure, of a valve associated with each motor, and operable to vary the circulation of liquid through the motor, and means for manually operating said valves either together or separately.

12. The combination with a plurality of fluid operated motors, of valve mechanism associated with each motor, a manually operable lever, connections between said lever and the valve mechanisms for operating the valve mechanisms of both motors together, said connections comprising additional levers either of which may be operated independently of the first-mentioned lever for separately operating the valve mechanisms of the two motors.

13. The combination with pumping mechanism, of means for varying the rate at which liquid is delivered thereby, motors operable by said liquid, valve mechanism associated with the motors, and means for differentially adjusting the valve mechanism.

14. The combination with motors, of means for supplying liquid under pressure to the motors, reciprocating valves controlling the circulation of liquid through the motors, and means for separately adjusting the throw of the valves to secure a differential variation in the speed of the motors.

15. The combination with motors, of means for supplying fluid under pressure to operate the motors, a slide valve associated with each motor, and manually operable means for separately adjusting the throw of said valves while the motors are running.

16. The combination with a plurality of motors, of means for supplying an operating liquid to the motors, valve mechanism associated with each motor and controlling the operation thereof, and manually operable means for operating the valve mechanisms to effect a variation in speed or reversal of the motors either together or separately.

17. The combination with a lever, of means for locking the lever in adjusted positions, racks carried by said lever, additional levers having the same axis of rotation as said first-named lever, locking pawls carried by said additional levers, differentially operable fluid operated mechanism controlled by said levers.

18. The combination with a casing comprising a pressure chamber and a supply chamber, of pumping mechanism located on one side of said casing, and a plurality of motors located on the opposite side of said casing and each comprising a plurality of cylinders and reciprocating pistons, said cylinders all being arranged in substantially the same horizontal plane.

19. In a fluid power transmission device, in combination, a pressure tank, a pump operable to pump fluid under pressure to said tank, a supply tank for the pump, a motor driven by said fluid, said motor also discharging fluid to said supply tank, and independent mechanism in the supply tank and pressure tank to independently regulate the pressure in said tanks.

20. In a fluid power transmission device, the combination with non-rotatable pumping mechanism, of a fluid pumped thereby, a motor driven by the fluid, a pressure pump, means operated thereby to regulate the quantity of fluid delivered by said pumping mechanism, and independent means to regulate the speed of the motor.

21. In a fluid power transmission device, the combination with non-rotatable pumping mechanism, of a motor driven by fluid supplied from said mechanism, a pressure pump, manually controlled means operated thereby to regulate the quantity of fluid delivered by said mechanism, and separate means manually controlled to regulate the speed of the motor.

In testimony whereof, I have signed my name to this specification in the presence of two subscribing witnesses.

AUGUST SUNDH.

Witnesses:
JOHN F. RULE,
JAMES G. BETHELL.